(12) United States Patent
Klein et al.

(10) Patent No.: US 9,218,487 B2
(45) Date of Patent: *Dec. 22, 2015

(54) REMOTE DOM ACCESS

(71) Applicant: TRUSTEER LTD., Tel Aviv (IL)

(72) Inventors: Amit Klein, Herzliya (IL); Eldan Ben-Haim, Tel Aviv (IL); Oleg Izmerly, Ramat Gan (IL); Shmuel Regev, Tel Aviv (IL); Michael Boodaei, Givatayim (IL)

(73) Assignee: TRUSTEER, LTD., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/513,077

(22) Filed: Oct. 13, 2014

(65) Prior Publication Data
US 2015/0128273 A1 May 7, 2015

Related U.S. Application Data

(63) Continuation of application No. 12/471,193, filed on May 22, 2009, which is a continuation-in-part of application No. 12/189,444, filed on Aug. 11, 2008, now Pat. No. 8,732,794.

(60) Provisional application No. 61/056,048, filed on May 26, 2008.

(51) Int. Cl.
G06F 21/00 (2013.01)
G06F 21/55 (2013.01)
G06F 21/52 (2013.01)
H04L 29/06 (2006.01)

(52) U.S. Cl.
CPC .............. *G06F 21/55* (2013.01); *G06F 21/52* (2013.01); *H04L 63/0263* (2013.01); *H04L 63/0281* (2013.01); *H04L 63/1416* (2013.01); *H04L 63/1441* (2013.01); *H04L 63/1466* (2013.01); *H04L 63/168* (2013.01); *G06F 2221/2119* (2013.01)

(58) Field of Classification Search
CPC ............ H04L 63/0281; H04L 63/0263; H04L 63/168; H04L 63/1441; G06F 21/55; G06F 21/52; G06F 2221/2119
See application file for complete search history.

(56) References Cited

U.S. PATENT DOCUMENTS

| 7,107,536 B1 * | 9/2006 | Dowling | 715/738 |
| 7,664,862 B2 * | 2/2010 | Barton et al. | 709/227 |
| 2008/0228910 A1 * | 9/2008 | Petri | 709/224 |

* cited by examiner

Primary Examiner — Shewaye Gelagay
Assistant Examiner — Kendall Dolly
(74) Attorney, Agent, or Firm — Daniel J. Swirsky; AlphaPatent Associates Ltd.

(57) ABSTRACT

A method for protecting a browser from malicious processes, comprises providing at least one process-proxy object and at least a browser-proxy object, interposed between the browser and a process, such that when the process invokes one of the DOM entry points, the process-proxy object isolates it from the real browser implementation and executes the process-proxy object's code instead.

6 Claims, 4 Drawing Sheets

REMOTE DOM ACCESS

CROSS-REFERENCE TO RELATED APPLICATIONS

This application is a Continuation of U.S. Ser. No. 12/471,193, filed 22 May 2009, which is a Continuation-In-Part of U.S. Ser. No. 12/189,444, filed 11 Aug. 2008, which claims benefit of U.S. Ser. No. 61/056,048, filed 26 May 2008 and which applications are incorporated herein by reference. To the extent appropriate, a claim of priority is made to each of the above disclosed applications.

FIELD OF THE INVENTION

The present invention relates to internet security and more particularly to a system allowing filtering data using a browser process firewall.

BACKGROUND OF THE INVENTION

A browser is a software application enabling a user to display and interact with information (text, images, audios and videos records and streams, forms, etc.) located on a page (also called, webpage) at a website on a network (such as the World Wide Web or an intranet). Any information on a webpage has an associated attribute allowing the linking of this information to other information at another location of a network.

Different protocols are available and allow communication through a network, and handling data in a large number of formats, such as HTML.

As an example, FIG. 1 is a simplified model of "client-server architecture". A client 101 (a browser) initiates a request 103 to a server 105 (a website). A server 105 receives the request 103, and replies with a message 107 containing, a requested file, an acknowledgement, an error message, or some other information.

U.S. Ser. No. 12/189,444 addresses problems related to malicious plug-ins, and its architecture is useful to understand the present invention and, therefore, shall be described herein in some detail, although the full specification of U.S. Ser. No. 12/189,444 is incorporated herein by reference. A plug-in (also called "browser plug-in") expands the functionalities of a browser by adding extra features to it. Many browser plug-ins are visible to the user and he/she can interact with these plug-ins. A plug-in can be, as an example, a toolbar, a search assistant or a set of functions allowing blocking pop-up windows. Others plug-ins are not visible to users and run without Graphical User Interface (GUI). However, some plug-ins, visible and invisible, can be malicious and can, for example, spy on the users (e.g. obtain unauthorized access to personal information and transmit it to a third party).

In order to reduce the risks generated by malicious plug-ins and more generally by malicious software, some approaches are available, such as the firewall technologies, which can highly limit the intrusion and the hijacking of personal data.

A firewall is a device or a software dedicated and configured in order to permit, to deny, to encrypt or to proxy computer traffic over a network connection, according a set of rules. Said network can be an organization network or the Internet. In all contexts, personal firewalls can be used in order to protect a single host by limiting the types of processes that are allowed to perform specified activities.

It is a severe drawback of network/personal firewalls, that they are useless when the user installs a malicious plugin. The plugin runs in the context of a trusted process (the browser, e.g. Microsoft Internet Explorer), and uses standard outgoing traffic (HTTP) to send stolen data out to an unauthorized location. Such activity cannot be distinguished from legitimate traffic sent by the same browser process. So a personal firewall doesn't affect malicious plug-ins, because they run within the realm of a trusted process and behave, for all it matters to the personal firewall, like the browser. Likewise, once the PC is infected, a network firewall is useless against malicious plug-ins, because they generate traffic that is indistinguishable from that of the browser.

As said, the above-described problem has been addressed in U.S. patent application Ser. No. 12/189,444, filed Aug. 11, 2008, by the same assignee hereof, having common inventors with the present invention. However, further protection can be provided by addressing the "Man in the Browser" attacks executed "remotely", i.e. from a process external to the browser. This attack is particularly relevant when a user navigates to a site using a browser (such as Microsoft Internet explorer). During his/her visit to the site, the user needs to ensure that the sensitive data entered into the site (such as login credentials) or displayed by the site (e.g. account status, health information) are not compromised by a malicious process that interrogates the DOM (Document Object Model) at that time.

This type of attack can be illustrated through the non-malicious program Snadboy Software's Revelation V2 (www.snadboy.com), a software utility that can be used to reveal concealed passwords fields from browsers. While this utility is not malicious per se, it illustrates a technique that can be used by malicious processes to obtain credentials entered into forms inside browsers.

It is an object of the present invention to increase the security of the data exchanged between a web browser and a website.

It is another object of the invention to provide protection on a per-page and per-process basis.

It is a further object of the invention to provide a system which can allow a process to access all sites except a set of "more sensitive" sites.

It is still another object of the present invention to provide software allowing to prevent malicious software from getting data.

Further purposes and advantages of this invention will become apparent as the description proceeds.

SUMMARY OF THE INVENTION

The method of the invention is used in conjunction with navigation through a browser whose internal data structures (e.g. DOM) may be accessed by other processes. The invention allows pre-loading the system with a set of rules determining which process needs to be allowed/disallowed, when (in which site/page/field) and to what extent (deny/allow read, deny/allow write/modify/delete).

In one embodiment the invention comprises an embedded proxy emulating said browser, and an embedded proxy emulating a process, thereby to protect said browser from malicious processes.

The invention also encompasses a method for protecting a browser from malicious process, comprising providing at least one process-proxy object and at least a browser-proxy object, interposed between the browser and a process, such that when the process invokes one of the DOM "entry points" e.g. getDocument, the process-proxy object isolates it from the real browser implementation and executes the process-proxy object's code instead, which returns a browser proxy object, wherein the ensemble of said browser-proxy object and of said process-proxy operates as a firewall for said browser.

According to one embodiment of the invention, the Browser Proxy Firewall (BPF) intercepts the call and creates a process proxy object and hands it to the browser. In one embodiment of the invention the BPF presents the browser to the process as a browser proxy object.

All the above and other characteristics and advantages of the invention will be further understood through the following illustrative and non-limitative description, with reference to the appended drawings.

DETAILED DESCRIPTION

Figure 1:
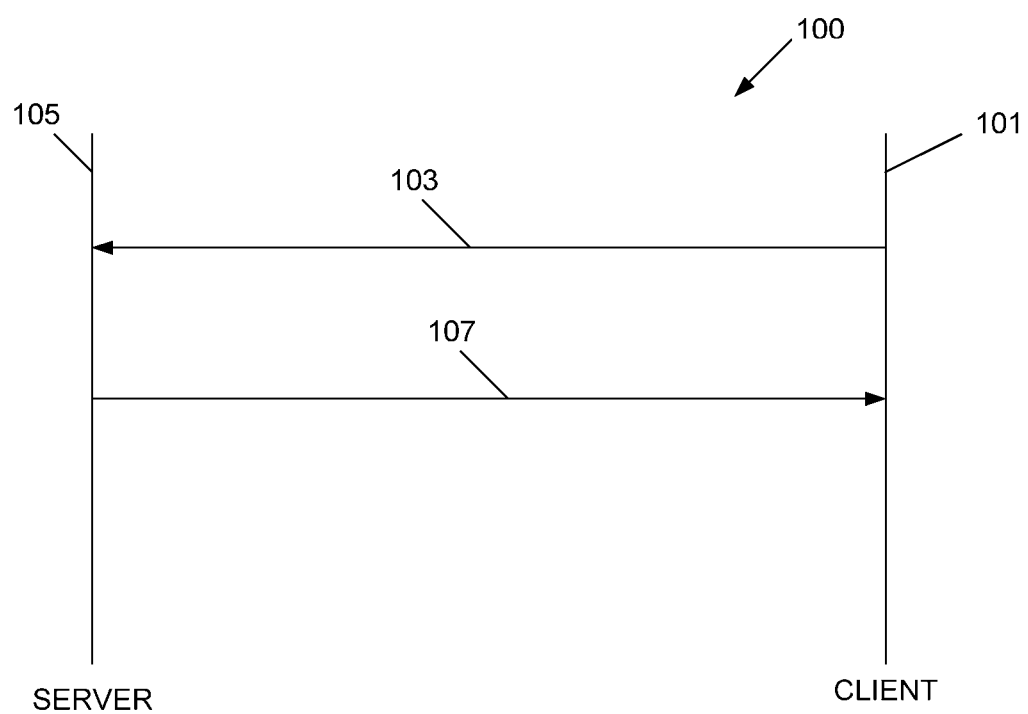
FIG. 1 is a schematic representation of a "classical" request/response flow between a web-browser and a server.

FIG. 1 is a simplified representation of a communication 100 between a client 101 (a browser) and a server 105 (i.e. a website). Client 101 sends a request 103 to server 105. Replying to the request 103 server 105 sends an answer 107, which can be a requested file (such as an HTML one), an acknowledgement, an error message, or other information.

Figure 2:
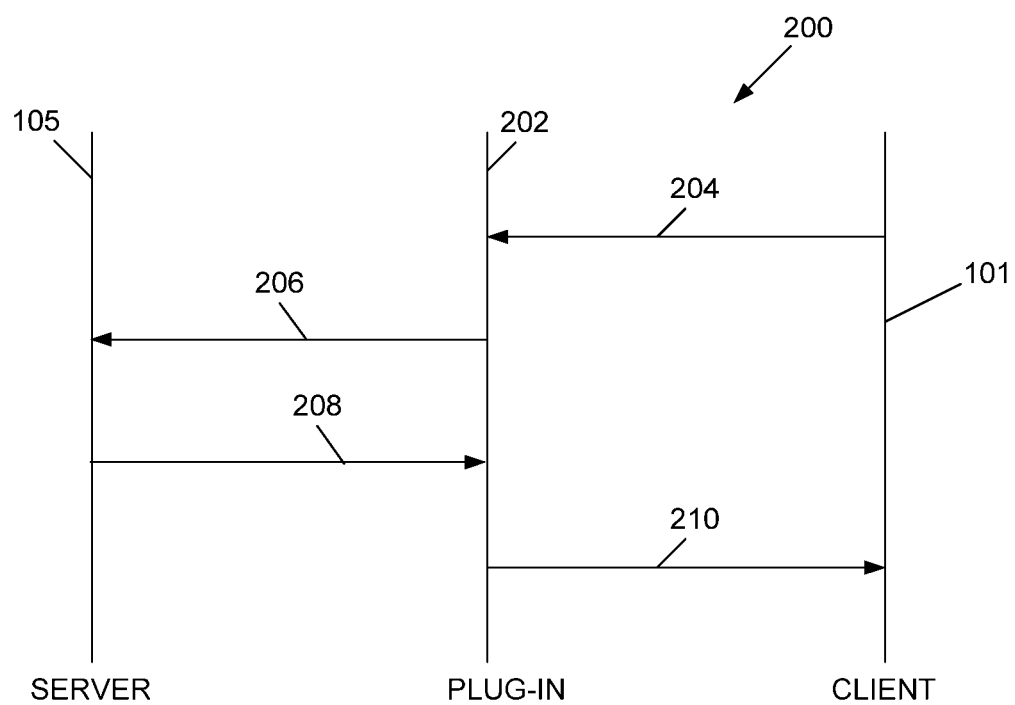
FIG. 2 is a schematic representation of an exchange of communication between a client and a server using a plug-in, according to U.S. Ser. No. 12/189,444.

FIG. 2 is an example of a simplified representation of one example of a communication 200 between a browser 101 and a server 105 involving plug-in 202, which can be, for example, malicious software. Client 101 sends a request 204 to server 105. This request 204 is intercepted by plug-in 202, which can transmit, destroy or change said request 204. A new request 206 is received by server 105. Answer 208 from server 105 to browser 101 is intercepted by malicious software 202 which can transmit, destroy or change said response 208. If changed, a new response 210 is transmitted to client 101.

Plug-ins can perform a great variety of operations. For instance, they can listen in on events (such as keystrokes), can encrypt and can decrypt messages, can play video and audio streams or edit documents. Credentials input by the user during a visit to a website 105, for instance, can be stolen using a malicious plug-in 202. To prevent such occurrences appropriate firewalling solutions must be provided. In the example to follow a plug-in operates as a proxy however, as said, a plug-in may assume many other functionalities besides operating as a proxy.

Figure 3:
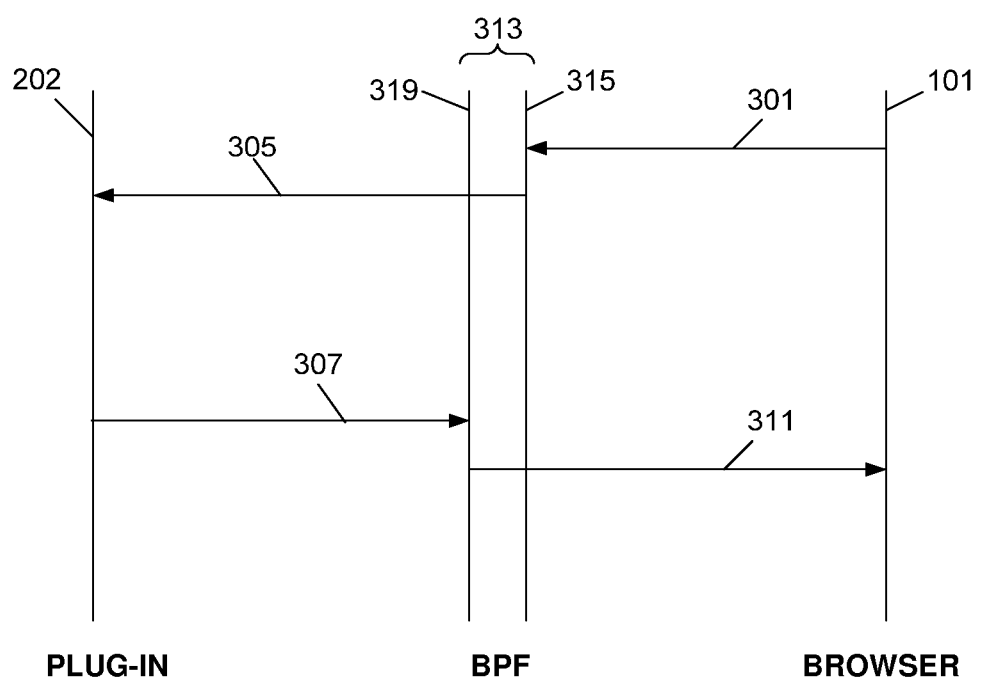
FIG. 3 is a schematic representation of the internal data flow according to one U.S. Ser. No. 12/189,444.

FIG. 3 is a schematic representation of the internal data flow into Browser-Plug-In Firewall (BPF) 313. BPF 313 comprises at least one plugin-proxy object 315 and at least a browser-proxy object 319. This allows BPF 313 to interpose itself between the browser 101 and a plug-in 202. As an example, BPF 313 is a "proxy" between a web-browser 101 and a plug-in 202, such that neither a web-browser 101 sees plug-in 105 directly, nor plug-in 202 sees the web-browser 101 directly. Instead, each party (web-browser 101, plug-in 202) sees the BPF 313, which emulates the other party.

When the browser 101 first attempts to load the plug-in 202, the BPF 313 intercepts this call 301 and presents said plug-in 202 to the browser 101 as the plug-in (proxy) 315, that is, it creates a plug-in proxy object 315 and hands it to the browser 101. BPF 313 loads the requested plug-in 202 itself, and saves its address, in the plug-in-proxy object 315. BPF 313 presents itself to the plug-in 202 as the browser 101, more particularly BPF 313 presents the browser to the plug-in 202 as a browser proxy object 319.

In an example of operation (without BPF), during a communication between web-browser 101 and plug-in 202, web-browser 101 tries to send request 301 to plug-in 202. More accurately, the browser 101 and plug-in 202 communicate via a model of subscription/invocation. The browser 101 invokes an initial plug-in function, hands a pointer to the browser (interface), which the plug-in 202 can interrogate; the plug-in 202 invokes the browser interface, finds the browser's subscription function, and subscribes to browser events through it. Browser 101 then invokes the event handler of the plug-in 202 whenever an event occurs.

The same process with BPF would take place as following: web browser 101 invokes an initial plug in function of the plug-in proxy 315, and hands it a pointer to the browser interface. The plug-in proxy 315 invokes the respective function in the plug-in 202, providing it with a pointer to the interface of the browser proxy 319. The plug-in 202 interrogates this interface, finds the subscription function (provided by the browser proxy 319) and subscribes to browser events by invoking it. The plug-in proxy in turn subscribes to the same events using the same interface of the browser 101. Browser 101 then invokes the event handler of browser proxy 319 whenever an event occurs. In turn, the browser proxy 319 may invoke the event handler of the plug-in 202, or not, with the original event data, or with modified event data, all according to rules (security policy), which may depend on e.g. the identity of the plug-in, the current event, and the context of the event (site, page, form, fields).

In another example plug-in 202 invokes functions in browser 101, to gain access to the browser's internal data structures. Request 301 (which may be an invocation by the browser of a plug-in function, handing over a pointer to the browser's data structures/interfaces to the plug-in) is intercepted by BPF 313 and more particularly by the plug-in proxy 315 emulating plug-in 202. The request is send to an analyzing element of BPF 313 (not shown in the figure), which may be internal or external to plug-in proxy 315 and to browser proxy 319, which checks it and sends it as a "new" request 305 to plug-in 202. Plug-in 202 can use the data provided in request 305 and send a request for information from the browser 307 to browser 101. However, BPF 313 intercepts message 307, using browser-proxy 319 emulating browser 101, and a "new" message is routed to the aforementioned analyzing element which checks it, filters it and/or modifies it in order to generate a "secure" response 311 which is sent to browser 101. Another possibility is to filter the browser's response to request 307/311.

Plug-in 202 can subscribe to browser 101 events, but since the plug-in 202 does not have direct access to the browser 101, plug-in 202 actually invokes the browser-proxy 319 subscription function, and the browser-proxy in turn subscribes the respective plug-in-proxy 315 to the same events in the browser 101.

During the browser 101 run-time, events are fired, such as form submissions, URL navigations and document load/unload, to which the plug-in-proxy 315 is subscribed. When the events reach the plug-in-proxy 315, it can decide in real-time, per site or URL or form, per event type, and per plug-in, whether to forward the event to the plug-in 202. When plug-in 202 receives the event, it may also attempt to access the browser 101 in order to interact with it. But again, it does not have a direct pointer to the browser object, but rather can communicate only with the BPF object (particularly with the browser proxy 319). BPF 313 may decide, again, per site or per URL, per plug-in, and per requested action, whether to allow the plug-in to perform the desired action or not. The decision of whether to forward an event to the plug-in 105, and what access is granted to the plug-in 105 is based upon whether the plug-in is signed, and/or on black-lists and white-lists of plug-in signatures, as well as on any other information available on the plug-in, such as its vendor, code patterns, signature values, type, etc.

BPF 313 can be installed by loading code into browser 101, which patches the function(s) that are used by browser 101 to load/create the plug-in objects. The patched function creates a proxy plug-in object 315 (for the browser 101), and a proxy browser object 319 (for the plug-in 202), instead of the actual plug-in 202, provides the plug-in 202 with the proxy browser 319, and returns the proxy plug-in 315 to the browser 101 (as the "created" plug-in 202).

Uninstalling can be as simple as closing the browser 101, or just un-patching the installation function (still leaving all created plug-ins 202 in proxy mode).

It is also possible to change the BPF 313 configuration using a Graphical User Interface (GUI). As an example, said GUI can allow to control some of the browser protection policy such what plug-ins are allowed or disallowed, according to their description, their publisher, their type, their path, whether they are correctly signed, or via any other signature (e.g. MD5 checksum).

"Updating" of pre-loaded rules can be done, for instance, by downloading new versions of black lists and white lists from a central server.

Furthermore, the BPF can assume multiple user profiles, so that each user of a shared computer can define his/her own rules. The BPF can also interact with a personal firewall as well as with antivirus and anti-spyware software. For example, a personal firewall and/or an antivirus and/or an anti-spyware program may notice that a new plug-in is installed, and can tag said plug-in as a suspicious or an approved one. This information, if it is fed to the BPF, can alter the BPF's policy enforced for this plug-in. Likewise, the BPF may alert the rules of the personal firewall and/or anti-virus and/or anti-spyware, if a plug-in makes any malicious and/or suspicious attempts. The personal firewall and/or the antivirus and/or the antispyware may, upon such indication, attempt to remove or to uninstall or to quarantine said plug-in. If the plug-in was installed as part of a larger installation, the whole installation may thus be suspected and acted upon.

The present invention expands on the protection afforded by the method and system described above. It comprises one or more browser-proxy objects (in Microsoft Internet Explorer architecture, these would be objects that implement the Document COM interface) and one or more process-proxy objects. However, the invention is by no means limited to the Microsoft Internet Explorer architecture, which is referred to by way of example only.

The process according to the invention interjects itself between the browser internal structures and the external process that attempts to access them. It therefore acts as a proxy between the browser and the process, such that neither the browser sees the process directly (except initially), nor the process sees the browser directly (except initially). Instead, each party sees the proxy, which emulates the other party.

When the external process first attempts to access the browser's internal data (the DOM—i.e. the Document object) e.g. through the getDocument function of the IWebBrowser2 interface of the browser, the process according to the invention intercepts this call (by having the browser's IWebBrowser2::getDocument function patched—e.g. in the virtual function table of the IWebBrowser2 interface). If the invention detects that the invocation is on behalf of an external process (as opposed to an invocation on behalf of the browser or a plug-in), it then returns a proxy object for the genuine browser document object (i.e. it creates and hands the external process a browser-proxy object). So if the external process logic saves the Document object address, it does in fact save the browser-proxy object address owned by the process of the invention.

Once it has a document object, the external process can subscribe to browser events, but since it doesn't have direct access to the browser, it actually invokes the browser-proxy subscription function, and the browser-proxy in turn subscribes the respective process-proxy to the same events in the browser.

During the browser run-time, it fires events (such as form submissions, URL navigations and document load/unload) to which the process-proxy is subscribed. When the events reach the process-proxy, it can decide in run-time, per site/URL/form, per event type, and per process, whether to forward the event to the external process itself. When the process receives the event, it may also attempt to access the browser (e.g. read/write the DOM). But again, since it does not have a direct pointer to the browser object, but rather, only to the browser proxy object, the browser proxy may decide, again, per site/URL, per process, and per requested action (read/write access, specific sub-object, e.g. DOM, location, etc.), whether to allow the process to perform this action or not.

The decision of whether to forward an event to the process, and what access is granted to the process can be of course based upon whether the process is in black-lists and white-lists of process signatures, as well as any other information available on the process, such as its vendor, code patterns, signature values, etc.

Figure 4:
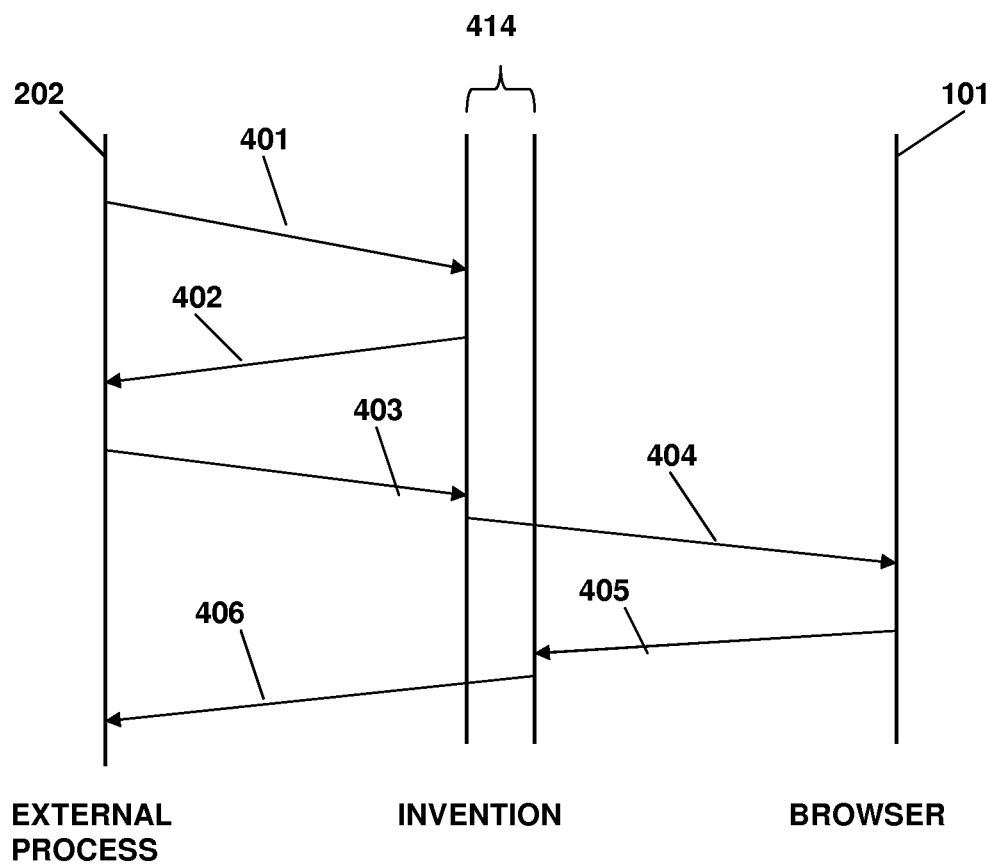
FIG. 4 is a schematic representation of the operation of the invention.

Referring now to FIG. 4, the invention is described when an external process 202 attempts to access a browser 101 through the process of the invention, 414. Without loss of generality and it being understood that the description to follow applies, mutatis mutandis, to other browsers, the following will assume that the browser is Microsoft Internet Explorer, and that the external process attempts to obtain a handle to the browser's DOM by invoking the browser's getDocument function (which is part of the IWebBrowser2 COM interface exposed by the browser).

The process 414 of the invention has the browser's getDocument patched, so 202 actually invokes 414's code, instead of invoking directly the browser's code.

414 returns a browser proxy object 401 for the Document object, to 202.

202 may then further interrogate 401 for additional information, but each time it does so, it will in fact invoke a function (code) from 414, which will optionally enforce a security policy on the request before forwarding it to 202, as well as optionally enforce additional security measures based on 101's response.

The external process 202 can also subscribe to browser events. This is done by invoking the Advise function of the Document (proxy) object (403) and providing it with an interface (Invoke) exposed by the external process 202. However, the proxy object will not forward the request as-is to the browser. Rather, it will prepare a client proxy for the browser and invoke the browser's Advise with this proxy (404).

When the browser 101 fires an event 405 (invoking the client proxy's Invoke function), the client proxy can apply a security policy w.r.t. the specific event—i.e. whether to withhold it from the external process or to forward it to the external process (406).

Although embodiments of the invention have been described by way of illustration, it will be understood that the invention may be carried out with many variations, modifications, and adaptations, without exceeding the scope of the claims.

The invention claimed is:

1. A method for protecting a browser from malicious processes, comprising:
   providing, responsive to determining that a request received by the browser was sent by a process that is external to the browser and any plug-ins of the browser a browser-proxy object to the process in response to the request; and
   providing a process-proxy object interposed between the browser and the process,
   wherein the browser-proxy object is configured to
      cause the process to send to the browser-proxy object a subsequent request that the browser perform an action involving Document Object Model (DOM) data maintained by the browser, and
      decide whether to allow the action to be performed, and
   wherein the process-proxy object is configured to
      receive from the browser any events for forwarding to the process, and
      decide whether to forward any of the events to the process.

2. A method according to claim 1, comprising providing control means to allow the user of the browser to choose which data said browser sends to the process.

3. A method according to claim 1, further comprising determining that the request received by the browser was sent by the process that is external to the browser and any plug-ins of the browser.

4. A system for protecting a browser from malicious processes, comprising:
   computer hardware;
   computer software embodied in a non-transitory, computer-readable storage medium;
   a browser configured to
      provide, responsive to determining that a request received by the browser was sent by a process that is external to the browser and any plug-ins of the browser, a browser-proxy object to the process in response to the request, and
      provide a process-proxy object interposed between the browser and the process;
   a browser-proxy object configured to
      cause the process to send to the browser-proxy object a subsequent request that the browser perform an action involving Document Object Model (DOM) data maintained by the browser, and
      decide whether to allow the action to be performed; and
   a process-proxy object interposed between the browser and a process, wherein the process-proxy object is configured to
      receive from the browser any events for forwarding to the process, and
      decide whether to forward any of the events to the process,
   wherein said browser, browser-proxy object, and process-proxy object are implemented in any of
   a) said computer hardware and
   b) said computer software embodied in said non-transitory, computer-readable storage medium.

5. The system according to claim 4, wherein the a browser configured to determine that the request received by the browser was sent by the process that is external to the browser and any plug-ins of the browser.

6. The system according to claim 4, further comprising control means to allow the user of the browser to choose which data said browser sends to the process.

* * * * *